Nov. 25, 1952 W. F. BENNING 2,618,979
POWER TAKE-OFF MECHANISM AND DRIVE THEREFOR
Filed Dec. 29, 1949 6 Sheets-Sheet 3

FIG-4-

INVENTOR:
WALTER F. BENNING.
BY
Harry O. Ernsberger
ATTY.

Nov. 25, 1952 W. F. BENNING 2,618,979
POWER TAKE-OFF MECHANISM AND DRIVE THEREFOR
Filed Dec. 29, 1949 6 Sheets-Sheet 6

INVENTOR:
WALTER F. BENNING.
BY
Harry O. Ernsberger
ATTY.

Patented Nov. 25, 1952

2,618,979

UNITED STATES PATENT OFFICE 2,618,979

POWER TAKE-OFF MECHANISM AND DRIVE THEREFOR

Walter F. Benning, Toledo, Ohio, assignor to Willys-Overland Motors, Inc., Toledo, Ohio, a corporation of Delaware Application December 29, 1949, Serial No. 135,805

3 Claims. (Cl. 74—15.4)

This invention relates to power transmission mechanism and more particularly to power take-off means for use with the power plant of an automotive vehicle.

Power take-off means have been used with vehicles such as trucks, tractors and the like over a considerable period of time but such means have been heretofore driven from the engine through the vehicle clutch so that the power take-off means is only operable when the vehicle clutch is engaged. With installations of this character when using the power take-off concomitantly with the moving vehicle, the speed of the power take-off is necessarily subservient to the speed of movement of the vehicle as both are driven through the vehicle clutch connection to the power plant engine. The conventional practice heretofore employed is to operate power take-off units through the transmission gearing or gear set, which arrangement does not provide for substantially constant speed for the power take-off shaft except when the vehicle is moving at a constant speed through the medium of a selected gear ratio for the vehicle drive wheels. It has been found that a power take-off shaft speed of approximately 536 revolutions per minute is an all around satisfactory operating speed for most uses, but the difficulties heretofore encountered in obtaining and maintaining this speed substantially constant in a powered vehicle have not been overcome.

It has long been a desirable objective to obtain a drive for the power take-off mechanism independently of the drive connection through the vehicle clutch so as to provide a free power take-off drive so that the speed of the power take-off may be directly proportionate to the engine speed at all times even though movement of the vehicle may be arrested by declutching or disconnecting the flow of power to the vehicle drive wheels. A drive of this nature is extremely desirable and especially advantageous for the operation of farm implements such as combines, hay balers, sprayers and the like where it is imperative for successful operation that a constant speed of such implements be maintained independently of vehicle movement. Such an arrangement would eliminate the independent power drive units which are at present built in as integral installations in many types of combines, hay balers, sprayers and other power consuming implements.

One of the principal objects of the present invention is the provision in combination with an automotive vehicle of a power transmission system and apparatus for the practical transmission of power to a power take-off unit which may be operated at a speed proportional to the engine speed irrespective of whether or not the vehicle is being moved by the power plant.

Another object of the invention is the provision of a mechanism for establishing a drive from a vehicle power source to a power take-off or supplemental power consuming unit independently of the transmission of power to the vehicle drive wheels.

Another object of the invention resides in the provision of a power take-off or power consuming unit which is arranged to be directly connected to the vehicle engine to be driven thereby irrespective of the transmission of power through a transmission gear set, fluid torque converter, fluid actuated transmission, or the like for establishing drive connection from the vehicle drive wheels to the vehicle power plant.

Still another object of the invention is the provision of a suitable combined clutch and gear reduction assembly for establishing a predetermined ratio of power take-off speed relative to the vehicle engine speed or for establishing a direct drive connection between the power take-off shaft and the vehicle engine.

A further object of the invention resides in the provision of mechanism for establishing a power take-off drive independently of the clutch means for connecting the vehicle engine to the vehicle drive wheels.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1:
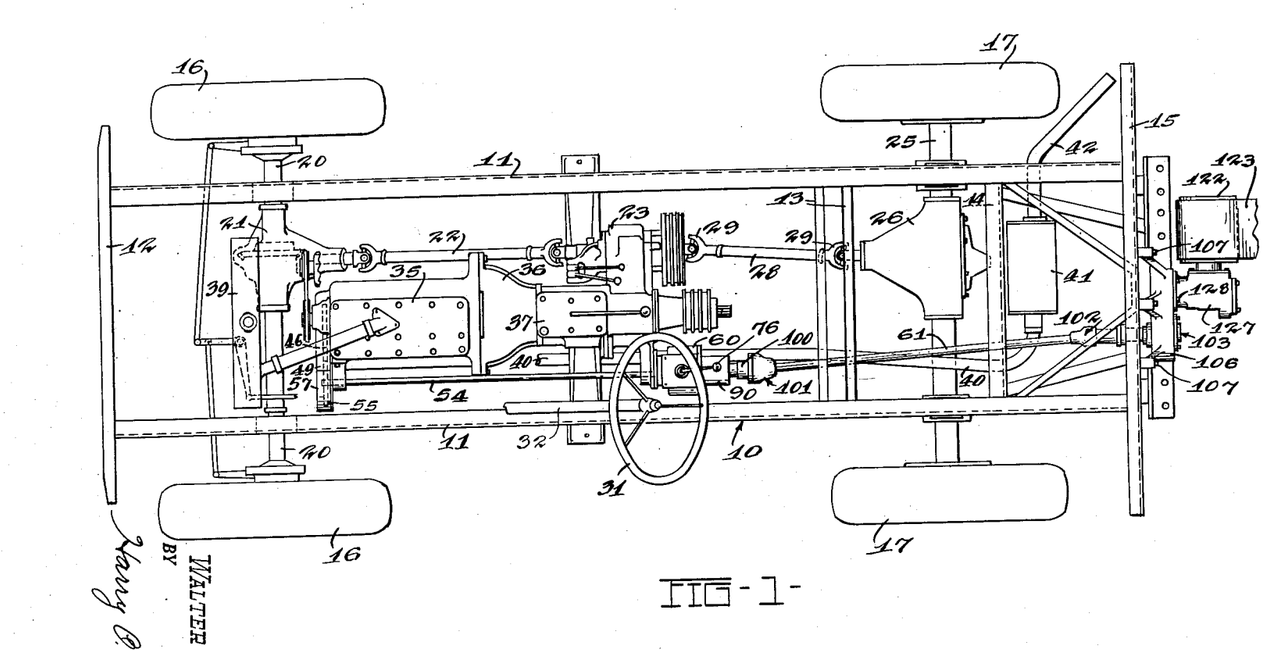
Figure 1 is a top plan view of a vehicle chassis illustrating a form of power take-off unit and drive connection therefor direct to the power plant or engine of the vehicle.

Referring to the drawings in detail and first with respect to Figure 1 there is illustrated a type of vehicle with which the arrangements of my invention have particular utility. The vehicle illustrated is of the so-called four wheel drive type which is especially suited for agricultural and industrial operations where power take-off mechanism is highly desirable. The vehicle illustrated in Figure 1 is inclusive of a frame construction 10 comprising longitudinally extending channel-shaped members 11 connected by transversely disposed members 12, 13, 14 and 15. The vehicle is supported upon front and rear wheels 16 and 17 the front wheels being dirigibly supported for steering purposes. The front wheel supporting means is connected to an axle or housing 20 which is formed with a housing 21 enclosing suitable drive gear and differential mechanism connected by means of a drive shaft 22 and universal joints to a transmission mechanism contained within a housing or transfer case 23 disposed amidship of the vehicle. The rear wheels 17 are carried by an axle 25 connected with a differential housing 26, the differential mechanism contained within the housing being connected to axle shafts (not shown) for driving the wheels 17 and to a propeller or drive shaft 28 connected through the medium of universal joints 29 with the transmission gearing or mechanism contained within the transfer case 23. The vehicle is provided with a steering wheel 31 mounted upon a steering post 32, the steering wheel being connected by suitable linkage (not shown) to the dirigibly mounted front wheels 16. The live axle shafts contained within the front axle are connected by suitable universal joints (not shown) to the spindles supporting the front wheels so that an effective drive connection is maintained to the front wheels during dirigible movements thereof.

The vehicle is provided with a power plant or internal combustion engine 35 which is carried upon the frame by suitable mounting means (not shown). Disposed rearwardly of the engine 35 is a clutch housing 36 which is secured to a housing 37 enclosing suitable change gear or transmission gear mechanism. Disposed rearwardly of the housing 37 is the transfer case or housing 23 which encloses additional or supplemental gearing shown in Figure 5 for obtaining exceptionally low drive ratios for the front and rear wheels and for selectively establishing a drive to the front wheels. The engine 35 is cooled by water which is circulated through a radiator 39 disposed at the forward end of the vehicle. An exhaust pipe 40 for conveying exhaust gases from the engine 35 is connected with a suitable muffler or sound attenuating device 41 to which is connected a tail pipe 42 for discharging exhaust gases into the air.

Figure 2:
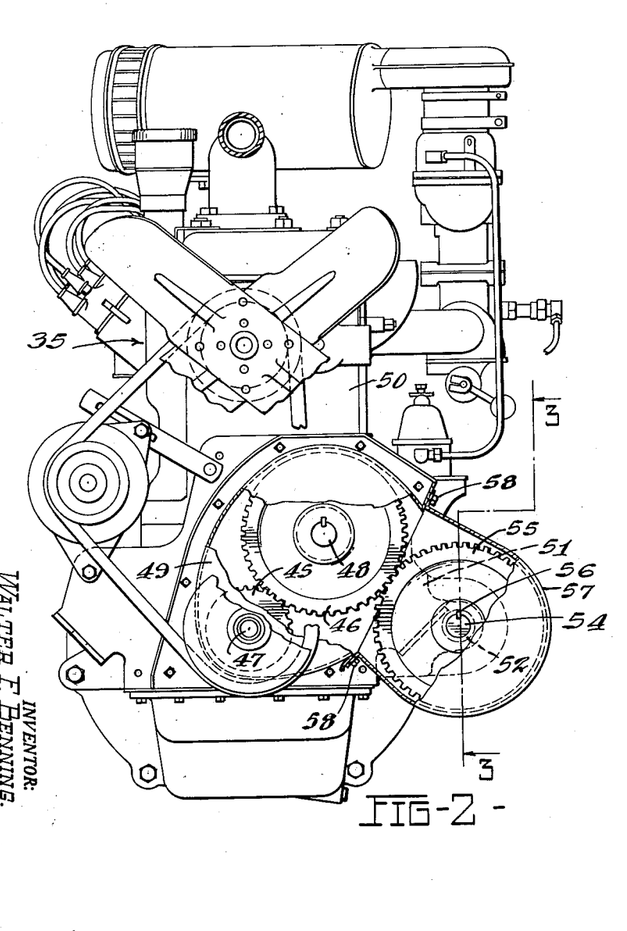
Figure 2 is a front view of the vehicle engine illustrating one form of drive connection for the power take-off.
Figure 3:
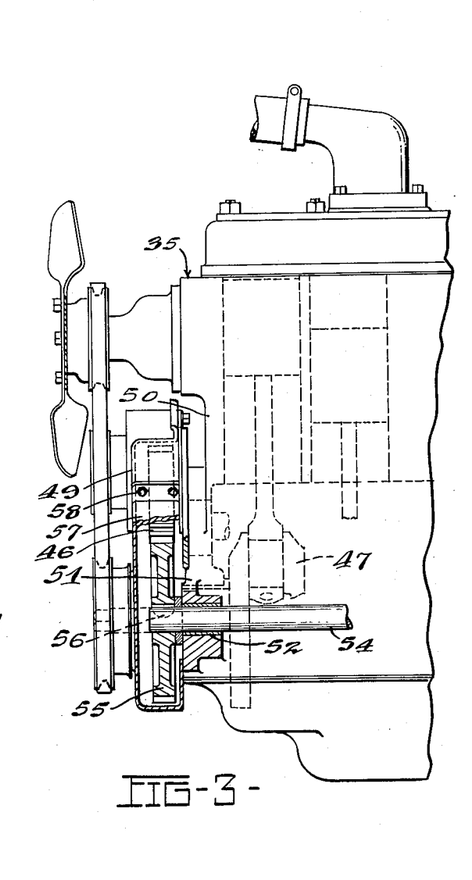
Figure 3 is a side elevational view of the engine illustrated in Figure 2, certain parts being broken away to illustrate the power take-off drive connection with the engine.

Figures 1, 2 and 3 illustrate an arrangement wherein a driving connection for a power take-off is established through means disposed at the forward end of the engine 35. As particularly shown in Figures 2 and 3 the engine is provided with timing gears 45 and 46, timing gear 45 being secured upon the end of the engine crankshaft 47 while the driven timing gear 46 is mounted upon the end of the camshaft 48 of the engine construction. The ratio of gears 45 and 46 is such that the camshaft 48 is driven at one half the speed of the crankshaft 47. A housing 49 bolted to the forward wall of the engine block 50 encloses the timing gears 45 and 46. The engine block 50 is provided with a transversely extending projection 51 which is bored to receive a bearing 52 within which is journaled a driven shaft 54 forming a drive for a power take-off unit. The shaft 54 projects forwardly of the bearing 52 and upon the projecting portion of the shaft is mounted a gear 55 held in place by a suitable key 56 or other appropriate means. The gear 55 is in mesh with the teeth of gear 46 so as to be driven thereby at all times during the operation of the engine 35. A housing member 57 encloses the gear 55, the housing being secured to the timing gear housing 49 by means of bolts 58.

The driven shaft 54 extends rearwardly of the engine to a housing 60 disposed amidship of the vehicle, the housing being supported by any suitable means. The housing 60 and mechanism contained therein is illustrated per se in Figure 7. This housing encloses a suitable dental or toothed clutch mechanism for directly transmitting power from the engine to the power take-off shaft 61 or through suitable gearing to obtain a lower speed for the power take-off unit as compared to the engine speed.

Figures 6, 7:
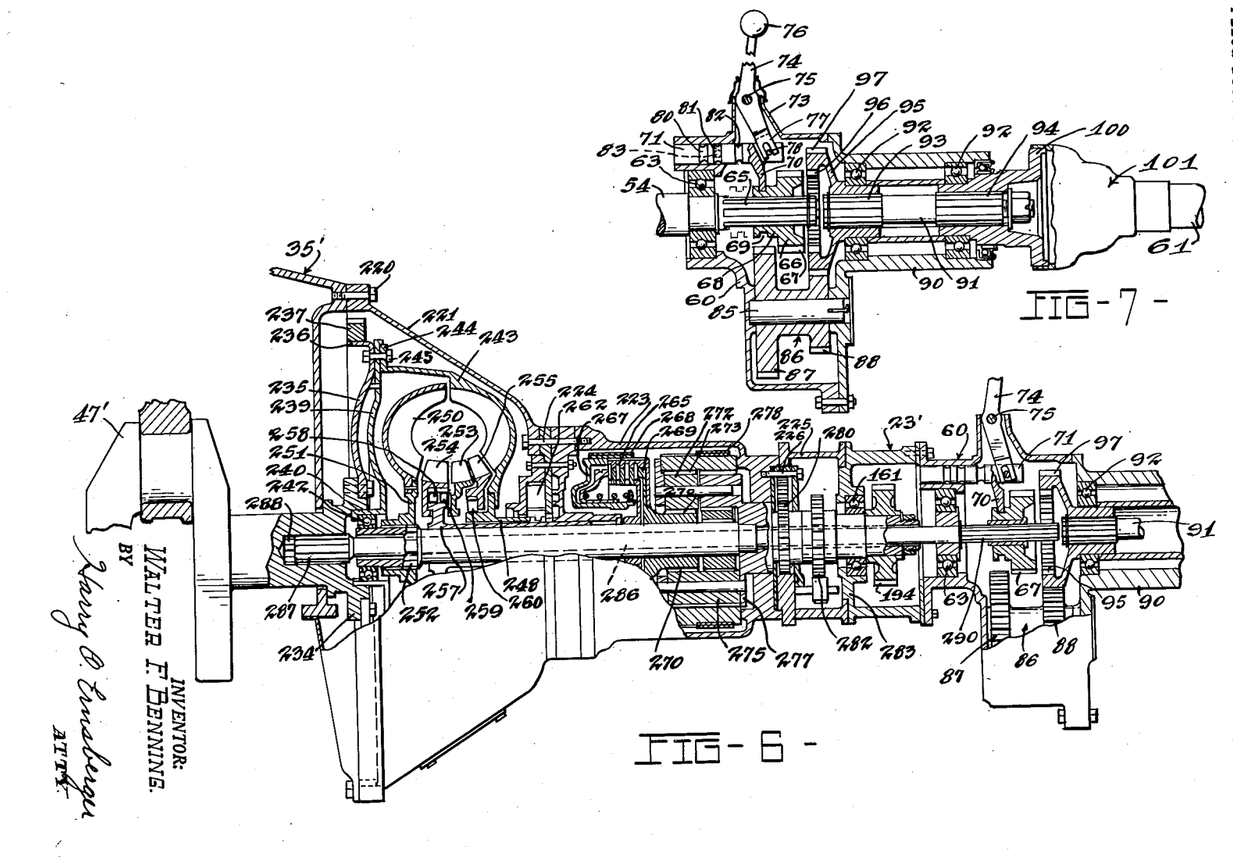
Figure 6 is a view similar to Figure 4 illustrating a power take-off drive mechanism incorporated in a vehicle having fluid torque converter as a power reduction mechanism for driving the vehicle.
Figure 7 is a vertical sectional view through a combined gear reduction unit and clutch mechanism for establishing a direct drive or a reduction in speed from the engine to the power take-off unit.

With particular reference to Figure 7 the housing 60 supports an anti-friction bearing 63 in which an end portion of shaft 54 is journaled. A portion of the shaft 54 extends through the bearing 63 into the interior of the housing 60 and is formed with splines 65 on which is slidably mounted a clutching gear 66 having clutch teeth 67 formed on the periphery thereof. The clutching gear 66 is formed with a hub portion 68 having a groove 69 within which is disposed a clutch shifting fork 70 the latter having a tenon or shaft like portion 71 slidably mounted in a suitable bore in the housing 60. The housing 60 is formed with an upwardly extending sleeve-like projection 73 upon which is fulcrumed a clutch shifting lever 74 supported upon a pin 75 providing a fulcrum for the lever. The lever 74 is formed at its upper end with a hand grip portion 76 to facilitate manipulation of the lever. The lower end of the lever 74 is formed with a bifurcated portion 77 adapted to straddle a pin 78 carried by the shifting fork 70 whereby movement of the lever 74 causes reciprocating movement of the shifting fork 70 to move the clutching gear 66 to selected positions. Means are provided for resiliently retaining the shifter fork 70 and the clutching gear 66 in adjusted or selected positions. The shaft-like portion 71 is formed with spaced peripheral recesses 80, 81 and 82 which are adapted for selective registration with a spring pressed ball 83 which cooperates with the recesses in the portion 71 to frictionally or resiliently hold the clutching means in desired positions.

Mounted in the housing 60 is a supplemental shaft 85 upon which is journaled a cluster gear member 86 formed with a gear 87 and a comparatively smaller gear 88 spaced therefrom. The housing 60 is formed with an extension 90 within which is slidably mounted a stub shaft 91 which is suitably journaled for rotation in anti-friction or ball bearings 92. The stub shaft 91 has its ends formed with splines 93 and 94. Mounted upon the spline 93 is a member 95 which is provided with internally arranged clutching teeth 96 and exteriorly with gear teeth 97, the latter being in constant enmeshment with the teeth of gear 88. It should be noted that the diameter of the clutch gear 66 is such that upon endwise movement of gear 66 in a right-hand direction as viewed in Figure 7, the clutching teeth 67 thereof will engage or enmesh with the teeth 96 on the member 95 to establish a direct drive from the shaft 54 through clutch gear 66 member 95 to the stub shaft 91. When the clutch gear 66 is moved in a left-hand direction as viewed in Figure 7 the teeth 67 of the clutch gear will mesh with the teeth of the larger gear 87 thus establishing a drive from shaft 54 through gears 87 and 88 to the gear 95 whereby stub shaft 91 is driven at a reduced speed as compared with the speed of the shaft 54.

Figure 8:
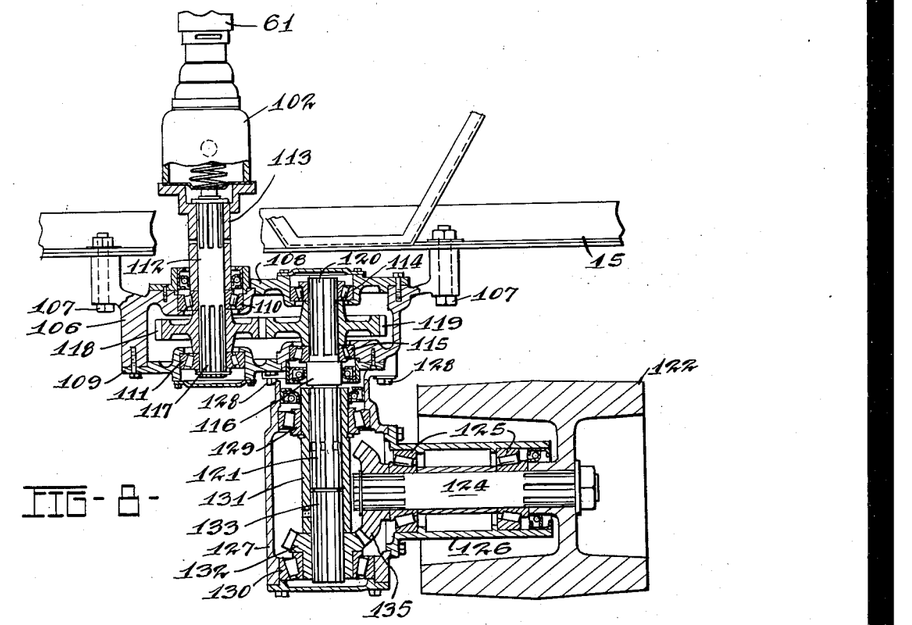
Figure 8 is a horizontal sectional view of a form of power take-off unit.
Figure 9:
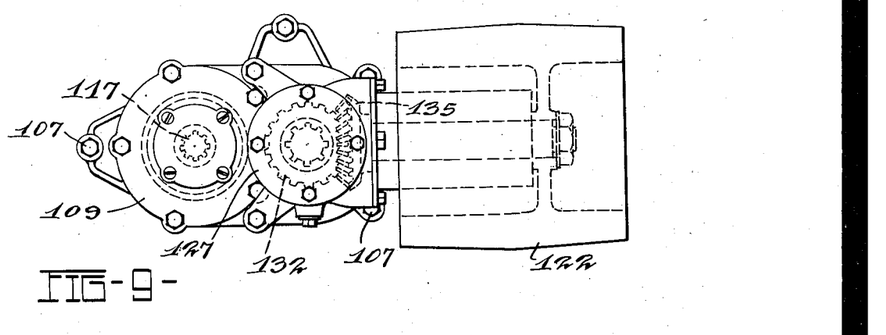
Figure 9 is an elevational view of the structure shown in Figure 8.

Secured to the splines 94 of stub shaft 91 is a coupling member 100 forming a part of a universal joint construction 101 which is connected to a second universal joint construction 102 through the medium of shaft 61. The universal joint 102 serves to connect the shaft 61 with a power take-off unit 103. While any suitable type of power take-off unit may be utilized with the present invention, I preferably use a power take-off mechanism of the character disclosed in patent No. 2,464,059 issued March 8, 1949. This form of power take-off is illustrated in Figures 8 and 9. The unit is inclusive of a housing 106 adapted to be bolted to the frame cross member 15 by means of bolts 107. The housing 106 is provided with covers 108 and 109 which are secured to the housing by suitable means. Journaled upon bearings 110 and 111 is a shaft 112 which is connected by means of a sleeve-like member 113 with the universal joint construction 102. Also journaled on bearings 114 and 115 is a second shaft 116 which projects rearwardly of the housing 106. Mounted upon a splined portion 117 of shaft 112 is a gear 118 which is in constant mesh with a gear 119 mounted upon a splined portion 120 of the shaft 116. The rearwardly extending shaft 116 has a splined portion 121 which may be connected to mechanism to be driven through the medium of the power take-off unit. As illustrated the splined portion 121 is arranged to drive a pulley 122 which in turn is connected by means of a belt 123 to mechanism to be operated. The pulley 122 is fixedly secured upon a shaft 124 journaled upon bearings 125 carried in a sleeve-like member 126 the latter being carried by a supplemental housing 127 which is adapted to be secured to the cover member 109 by means of bolts 128. The supplemental housing 127 is provided with bearings 129 and 130 upon which is journaled a sleeve 131 and a gear 132. The sleeve 131 serves to connect the splined portion 121 of shaft 116 with a splined stub shaft 133 upon which gear 132 is mounted. The sleeve establishes a drive connection from shaft 116 to the gear 132. The gear 132 is in mesh with a gear 135 fixed to the shaft 124. By means of the mechanism above described a drive is established to the pulley 122 from shaft 61 through the medium of universal joint 102, shaft 112, gears 118 and 119, shaft 116, sleeve 131, shaft 133, gears 132 and 135, and shaft 124 which carries the driven pulley 122. The supplemental housing 127 may be removed by removing the bolts 128 so that mechanism such as a combine or the like may be connected directly to the splined portion 121 of shaft 116.

In this form of the invention it is to be noted that the shaft 54 is directly connected with the engine 35 so as to be rotated at all times when the engine is in operation and thus a power take-off drive is available at all times whether the vehicle is moving or not as the power take-off drive system or arrangement is operable independently of the power transmission gearing or mechanism for transmitting power from the engine to the drive wheels of the vehicle. Thus even though the engine is disconnected from the drive wheels through the disconnection of the conventional clutch contained within the housing 36, power may be transmitted to the power take-off mechanisms. By reason of the gear system and clutch arrangement shown in detail in Figure 7, a direct drive connection may be established between stub shaft 91 and the engine, or if a reduction in power take-off speed as compared with the speed of the engine is desired, the clutch gear 66 may be enmeshed with the gear 87 so as to provide a reduced speed for the power take-off mechanism. It has been found that for most power take-off uses in operating combines, baling machines, sprayers, harvesting machines and the like, a power take-off shaft speed of about 536 R. P. M. is satisfactory and through the use of the reducing gear mechanism shown in Figure 7 the engine is enabled to operate at a sufficient speed to develop adequate power at the power take-off shaft for most purposes. The engine speed for such purposes may be controlled by a suitable governor (not shown).

Figure 4:
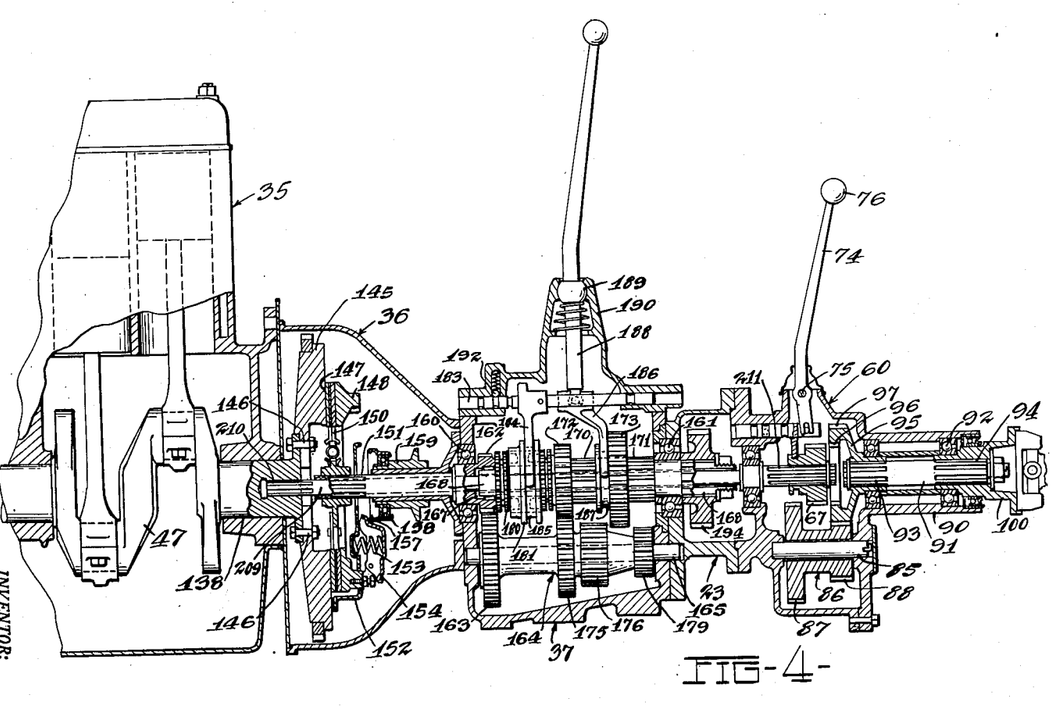
Figure 4 is a vertical sectional view through a portion of the vehicle engine, the clutch mechanism and a transmission gear set illustrating another form of drive connection direct from the engine to the power take-off unit.
Figure 5:
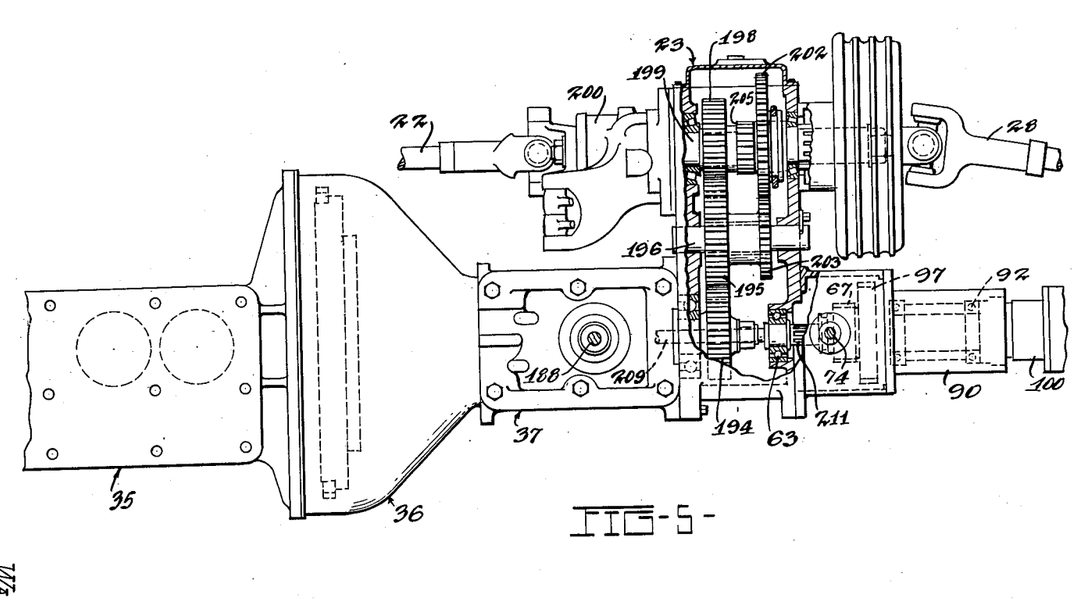
Figure 5 is a top plan view of the arrangement illustrated in Figure 4.

Figures 4 and 5 illustrate a modification of the invention wherein the power take-off drive means is directly connected with the rear end of the engine crankshaft. As illustrated the engine 35 and a crankshaft 47 is supported in a main bearing 138 at the rear end of the crankshaft. Disposed rearwardly of the engine 35 is the clutch housing 36 and secured to the clutch housing is a transmission housing 37. To the rear of the housing 37 is a supplemental transmission housing or transfer case 23 which contains gearing for obtaining greatly reduced driving ratios for the four wheel drive vehicle illustrated in Figure 1.

Disposed within the clutch housing 36 is a flywheel 145 which is fixedly carried upon the end of the crankshaft 47 by means of bolts 146. The flywheel is provided with a clutch face 147, a clutch ring 148 being disposed adjacent and spaced from a flywheel 145. Interposed between the face 147 and the clutch ring 148 is a driven clutch disk 150 for establishing a friction drive connection between the flywheel 145 and a sleeve-like member or hollow shaft 151. The clutch ring 148 is mounted on suitable brackets 152 carried by the flywheel 145, a series of springs 153 cooperating with members 154 serving to urge a clutch ring 148 into engagement with the clutch disk 150 to establish friction driving connection between the flywheel and the driven clutch disk. The inner ends of members 154 are in engagement with a ring 157 forming part of a clutch throwout bearing 158 the latter being carried by a sleeve 159 which is adapted to be shifted longitudinally of the shaft 151 by suitable operating mechanism (not shown).

The end walls of the transmission gear housing 37 are provided with openings in which are disposed suitable anti-friction or ball bearings 160 and 161. The bearing 160 serves to journally support the sleeve-like shaft 151. Integrally formed on a portion of the shaft 151 extending into the housing 37 is a gear or toothed formation 162 which is in constant mesh with a gear 163 forming a part of a cluster gear 164 journaled for rotation on a countershaft 165. The end portion of the shaft 151 is recessed as at 167 to accommodate the end of a second sleeve-like shaft 168 which extends through the housing 37 and is journally supported upon the anti-friction bearing 161. The shaft 168 is provided with splined portions 170 and 171 adapted to respectively accommodate gears 172 and 173, both of said gears being axially slidable along the shaft 168 for selective enmeshment with gears 175 and 176 forming elements of the cluster gear 164. A gear 179 forming a part of the cluster gear 164 is in mesh with a reverse idler gear (not shown). In order to obtain reverse direction of the drive wheels, the gear 173 is moved in a right-hand direction as viewed in Figure 4 into mesh with the reverse idler gear.

Disposed between the gears 162 and 172 is a synchronizer mechanism including synchronizer rings 180 and dental clutches formed on a slidable member or sleeve 181 for connecting sleeve 181 with the end of shaft 151 for establishing a direct drive connection from the engine to the shaft 168. Movement of the sleeve 181 in a right-hand direction as viewed in Figure 4 connects the dental clutches (not shown) to effect a driving connection between gear 172, sleeve 181 and shaft 168 for obtaining a second or intermediate driving speed. Movement of gear 173 in a left-hand direction into mesh with gear 176 provides a low speed drive from the engine to the shaft 168. Means for shifting the sleeve 181 is inclusive of a slidable shaft 183 which carries a forked or bifurcated member 184 extending into a groove 185 formed in sleeve 181. The means for shifting gear 173 is inclusive of a slidable shaft similar to shaft 183 upon which is mounted a bifurcated shifter member 186 which projects into a groove 187 formed in a hub portion of gear 173. A shifter lever 188 is pivotally supported by means of a ball 189 supported in an upwardly projecting portion 190 of the transmission housing 37, said lever 188 being adapted to be oscillated to move the shifter forks 184 and 186 in a conventional manner in order to obtain the various gear ratios or direct drive. The slidable shaft 183 is resiliently held in its several positions by means of a spring urged ball or detent 192 which cooperates with peripheral recesses in the shaft. The slidable shaft (not shown) for moving the shifter fork 186 is retained in its selected positions by similar spring urged detent means (not shown).

In this form of vehicle construction, a so-called transfer case or supplemental transmission housing 23 encloses auxiliary gearing for the purpose of obtaining exceptionally low driving ratios for the four wheel drive wheels and for establishing or disestablishing a drive with the front wheels. The mechanism contained within the transfer case 23 is illustrated in Figure 5 and is inclusive of a gear 194 which is splined or otherwise secured to the end of the shaft 168 whereby the said gear is driven at different speeds with respect to the crankshaft speed through the change speed gearing contained in the transmission housing 37 hereinbefore described. The gear 194 is in constant mesh with a gear 195 which is journaled upon a pin or shaft 196 mounted in the walls of the transfer case housing 23. The intermediate gear 195 is in constant mesh with a driven gear 198 journaled upon a stub shaft 199 mounted in bearings carried by the walls of the case 23. Extending forwardly of the case 23 is a supplemental casing or housing 200 which encloses a shiftable dog clutch (not shown) for connecting the shaft carrying gear 198 with the front wheel driving or propeller shaft 22. The shaft 199 is provided with a splined section upon which is slidably mounted a gear 202 having splined connection with the shaft. The gear 202 when shifted to the right-hand position as viewed in Figure 5 will be in mesh with a gear 203 formed integrally with the gear 195 but of a different diameter so as to obtain a reduced driven speed for the gear 202. With gear 202 in mesh with gear 203 a low gear ratio is established between gear 194 and gear 202 to drive the shaft 199 and hence the front propeller shaft 22 and the rear propeller shaft 28 at reduced speed. Integrally formed on gear 202 is a dental clutch configuration 205 which is adapted when the gear 202 is moved in a left-hand direction as viewed in Figure 5 to enmesh with a suitable reciprocally-shaped dental clutch configuration (not shown) formed on the interior of the gear 198. When the dental clutch 205 is in operative or clutching engagement with gear 198 a drive is established to the front and rear wheels through the shafts 22 and 28 by means of gears 194, 195, 198 and shaft 199. It is to be understood that the dental clutch (not shown) disposed in the supplemental housing 200 may be selectively shifted to positions to connect or disconnect the front drive shaft 22 with the transfer case mechanism in order to establish or disestablish a drive connection to the front wheels of the vehicle.

In this form of the invention, as in the form previously described, the power take-off drive is arranged for operation directly from the engine crankshaft 47 independently of the transmission gearing contained in the transmission housing 37, and independently of the gearing contained in the transfer case or supplemental transmission housing 23. With particular reference to Figure 4, it will be noted that shaft 151 and shaft 168 in alignment therewith are of tubular or sleeve-like formation. Extending through shafts 151 and 168 is a solid shaft 209 which is splined at its forward end as indicated at 210 so to be positively driven by the crankshaft 47. The shaft 209 extends entirely through the clutch housing 36, transmission casing 37 and transfer case housing 23 and has a splined portion 211 extending into the housing 69 containing the slidable dental clutch mechanism and reduction gearing as shown in Figure 7. In this form of the invention the splined portion of the shaft 211 corresponds to the splined portion 65 of the shaft 54 illustrated in Figure 7. The drive to the power take-off unit shown in Figures 8 and 9 is established through the coupling 100 connected with the coupling 102 so as to transmit power to the power take-off unit 103.

It will be seen from the foregoing description of this form of the invention that the shaft 209 is continuously driven from the engine crankshaft 47 independently of the gearing and mechanism contained within the clutch housing 36 and the main and supplemental transmission mechanisms contained in housings 37 and 23. Thus whenever the engine is operating, the gear 66 is rotated continuously so as to effect either a direct drive connection between the engine crankshaft and the power take-off mechanism through engagement of gears 66 with the internal teeth 96 of gear 95 or for establishing reduction in driving speed of the power take-off shaft through enmeshment of the gear 66 with the gear 87. It is to be understood that for efficient power take-off operation when the unit is connected with an agricultural machine where power is required for the latter's operation as for example, a combine, corn picker, potato harvester and the like, such machinery is operated at a shaft speed of approximately 536 R. P. M. through governor control of the engine. This is the present standard drive speed recommended by manufacturers of such agricultural machinery requiring power take-off mechanism with a prime mover vehicle. Thus, the gear reduction effected through the relative sizes of gears 87 and 88 and the gear elements in mesh therewith is such as to provide the required shaft speed for the power take-off at an engine speed of approximately 1100 R. P. M. It is desirable to hold the speed of the engine at or above 1100 R. P. M. in order that the engine may develop adequate power to drive the agricultural implement connected to the prime mover vehicle. The power take-off shaft may be completely disconnected from the engine 35 of the prime mover vehicle by moving the shiftable clutching gear 66 to its intermediate or neutral position as indicated in Figure 7. The direct drive of the power take-off shaft obtained through the intermeshment of clutching gear 66 with the internal teeth 96 of gear 95 is desirable when operating the pulley take-off element 122 for driving instrumentalities with the prime mover vehicle in static position. With the mechanism in direct drive for the power take-off, the speed of the belt driving pulley 122 is directly dependent upon the speed of the engine crankshaft 47.

Figure 6 is illustrative of a form of the invention of power take-off arrangement in combination with a transmission of the type generally referred to as a fluid torque converter having the characteristic of torque multiplication in order to obtain reduced speed of the propeller or drive shaft with respect to the engine speed during acceleration of the vehicle. 47' indicates the engine crankshaft contained within the engine block 35'. Secured to the engine block by means of bolts 220 is a housing 221 which houses or encloses the torque converter elements. Disposed at the rear of the housing 221 is a second housing 223 connected to housing 221 by means of bolts 224. Disposed rearwardly of the housing 223 is a third housing 225 secured in place by means of bolts 226. The housing 225 encloses a parking brake mechanism. Secured to the casing 225 is the transfer case 23' containing the gearing for establishing exceptionally low gear ratios to the drive wheels and is illustrated in Figure 5. Arranged rearwardly of the casing 225 is the casing 60 enclosing the power take-off reduction gear and clutch mechanism illustrated per se in Figure 7.

As the fluid torque converter and power transmission adjuncts forming parts thereof are of conventional design this mechanism will be herein described in such detail as to illustrate the arrangement of my invention. The crankshaft 47' is provided with a flange 234 to which is bolted or otherwise secured a fly wheel member 235 formed at its periphery with an axially extending flange 236 to which is welded or otherwise secured a ring gear 237 having peripherally arranged teeth adapted to be enmeshed with suitable starter gearing (not shown) for initially starting the engine. Disposed adjacent the fly wheel member 235 is a disk-like member 239 having its innermost portion formed with a flange 240 which extends within a recess formed at the end of the crankshaft 47' the flange enclosing an anti-friction or ball bearing 242. The converter is inclusive of a primary pump element or rotor 243 formed with a flange portion 244, suitable securing bolts 245 passing through the flange 244 serve to retain the disk-like member 239 and the primary pump element 243 to the fly wheel member 235. The primary pump element 243 of the converter is thus directly connected with the engine crankshaft 47' and adapted to rotate therewith. A central hub portion of the primary pump element 243 is secured to a sleeve-like member 248.

The torque converter assembly is inclusive of a turbine element 250 which is secured to a sleeve-like member 251 which is splined to a driven shaft 252. The converter mechanism also includes a primary stator 253, a secondary stator 254 and a secondary pump element 255. The secondary stator is mounted upon a sleeve-like element 257 by means of an overrunning clutch 258 while the primary stator 253 is connected to the sleeve-like member by means of an overrunning clutch 259, the secondary pump element 255 being carried upon the sleeve-like element 258 through the interposition of an overrunning clutch 260. One of the oil pumps for circulating oil for the converter, lubrication purposes and hydraulic control is illustrated at 262. The movable element of the oil pump 262 is driven by the sleeve-like element 248.

Disposed within the housing 223 are mechanisms for performing the functions of providing direct drive, emergency low, reverse and neutral. The arrangement includes a multiple disk clutch 265 which is hydraulically operated for locking the transmission mechanism in order to secure direct drive with the sleeve 257. The mechanism is inclusive of a drum 267 which is arranged to be engaged by a band clutch 268 which is adapted under certain conditions of operation to engage the drum 267 to secure emergency low gear drive. The driven element 269 of the clutch 265 extends rearwardly and is formed with a sleeve-like portion provided with gear teeth 270 adapted for enmeshment with a plurality of planet gears 272 which cooperate with a gear 273 to secure emergency low gear. The planetary mechanism is also inclusive of reverse planet pinions 275, both sets of pinions being journaled upon stub shafts carried by a spider 277. The mechanism also includes a reverse gear (not shown), a reverse band clutch 278 being cooperable with the member carrying the gear 273 for obtaining reverse drive to the drive wheels of the vehicle. The spider 277 extends rearwardly and is operatively arranged to drive a second oil pump 280 and toothed member 282 forming an element of a parking brake mechanism for the vehicle. The spider extends through a partition or wall 283 formed in the casing 225, chamber 23' of the casing accommodating transfer gear mechanism of the character shown in detail in Figure 5. In this form of the invention the sleeve-like extension of the spider 277 supports the gear 194 of the transfer case mechanism. As the latter mechanism is shown in Figure 5, it is believed unnecessary to further describe the mechanism shown in Figure 5 and driven through the gear 194 to obtain a drive to the wheels of the vehicle.

Disposed within the sleeve-like shaft 252 is a power transmitting shaft 286, the forward extremity of which is enlarged as at 287 and is exteriorly splined so as to establish a drive connection directly with the crankshaft 47' of the engine, the splined portion 287 of the shaft extending into a correspondingly splined recess 288 formed in the end of the crankshaft. The shaft 286 extends through the sleeve-like shaft 252 and through a hollow central bore formed in the spider 277. The rear end of the shaft 286 is provided with a splined portion 290 which extends into the casing 60 containing the gearing mechanism and clutch for establishing a drive connection to the power take-off mechanism. The casing 60 and mechanism contained therein is shown in Figure 7 and this mechanism is utilized in connection with the form of the invention shown in Figure 7 to complete the drive arrangement to the power take-off unit 103.

It is to be noted that the transmission of power to the drive wheels of the vehicle takes place through the fluid torque converter contained within the housing 221 and the gear system and mechanism contained within the housing 223 which conveys power to gear 194 and thence to the drive wheels of the vehicle by the mechanism shown in Figure 5. The drive to the power take-off mechanism is accomplished through the connection of the shaft 286 directly with the crankshaft 47' of the engine and conveys power direct to the gearing contained in the housing 60. By this means the power take-off unit may be operated directly from the engine and is unaffected by the operation of the fluid torque converter and speed reducing mechanism contained within the housings 221 and 223. The clutch gear 66 forms a part of the mechanism contained within the housing 60 for establishing and disestablishing a drive connection between the power take-off driving shaft 286 and the shaft 61 to the power take-off unit 103 in the manner illustrated in Figure 1 of the drawings.

Thus in the forms of the invention herein disclosed and described, a drive for a power take-off mechanism is established directly with the engine or power source which is operable at all times irrespective of whether the vehicle is in motion and is adaptable for selective operation at different speeds through the use of the mechanism contained in the housing 60.

What I claim is:

1. In a wheeled vehicle provided with an internal combustion engine, the combination with a crankshaft driven by said engine, a power transmission for conveying power from said crankshaft to the wheels of the vehicle and including a hollow shaft, and shiftable clutch means for detachably connecting said hollow shaft to said crankshaft, of a power take-off unit mounted upon the vehicle, and means for driving said power take-off unit comprising a drive shaft mounted in said hollow shaft and connected directly and continuously to said crankshaft, a driven shaft, means connecting said driven shaft with said power take-off unit to actuate the same on rotation of said driven shaft, driving means operable to drive said driven shaft from said drive shaft at a speed different from said drive shaft, and a shiftable clutch member shiftable from a neutral position, in which said drive shaft is disconnected both from said driven shaft and from said driving means, selectively to other positions in one of which said drive shaft is connected directly with said driven shaft and in another of which said drive shaft is connected with said driving means to actuate the same, whereby to drive said driven shaft at the same speed as said crankshaft, and at a different speed from said crankshaft, selectively.

2. In a wheeled vehicle provided with an internal combustion engine, the combination with a crankshaft driven by said engine, a power transmission for conveying power from said crankshaft to the wheels of the vehicle and including a hollow shaft, and shiftable clutch means for detachably connecting said hollow shaft to said crankshaft, of a power take-off unit mounted upon the vehicle, and means for driving said power take-off unit comprising a drive shaft mounted in said hollow shaft and connected directly and continuously to said crankshaft, a driven shaft mounted in axial alignment with said drive shaft, means operatively connecting said driven shaft with said power take-off unit to actuate the same on rotation of said driven shaft, a countershaft, gearing for driving said countershaft from said drive shaft at a speed different from the speed of rotation of said drive shaft, gearing connecting said countershaft with said driven shaft to drive said driven shaft from said countershaft on rotation of said countershaft, and a shiftable clutch member shiftable from a neutral position, in which said drive shaft is disconnected both from said driven shaft and from said countershaft, selectively to other positions in one of which said drive shaft is connected directly with said driven shaft and in another of which said drive shaft is connected with said countershaft through said first-named gearing, whereby to drive said driven shaft at the same speed as said crankshaft and at a different speed therefrom, selectively.

3. In a wheeled vehicle provided with an internal combustion engine, the combination with a crankshaft driven by said engine, a power transmission for conveying power from said crankshaft to the wheels of the vehicle and including a hollow shaft, and shiftable clutch means for detachably connecting said hollow shaft to said crankshaft, of a power take-off unit mounted upon the vehicle, and means for driving said power take-off unit comprising a drive shaft mounted in said hollow shaft and connected directly and continuously to said crankshaft, a driven shaft mounted in axial alignment with said drive shaft, means operatively connecting said driven shaft with said power take-off unit to actuate the same on rotation of said driven shaft, a countershaft, gearing for driving said countershaft from said drive shaft at a speed different from the speed of rotation of said drive shaft, gearing connecting said countershaft with said driven shaft to drive said driven shaft from said countershaft on rotation of said countershaft, and a shiftable clutch member shiftable from a neutral position, in which said drive shaft is disconnected both from said driven shaft and from said countershaft, selectively to other positions in one of which said drive shaft is connected directly with said driven shaft and in another of which said drive shaft is connected with said countershaft through said first-named gearing, whereby to drive said driven shaft at the same speed as said crankshaft and at a different speed therefrom, selectively, and said power take-off unit comprising a housing, a splined shaft, means for driving said splined shaft from said driven shaft, said splined shaft having a splined portion which extends into said housing, a gear journaled in said housing and having splined connection with said splined portion to be driven by said splined shaft, a shaft driven by said gear, and a power take-off pulley secured to the last-named shaft, said housing, gear and pulley being detachable as a unit from said splined shaft, to permit direct connection of said splined shaft with apparatus that is to be driven thereby.

WALTER F. BENNING.

REFERENCES CITED

The following references are of record in the file of this patent:

UNITED STATES PATENTS

| Number | Name | Date |
| --- | --- | --- |
| 1,518,161 | Otwell | Dec. 9, 1924 |
| 1,570,925 | Schmidt | Jan. 26, 1926 |
| 2,168,033 | Johnston et al. | Aug. 1, 1939 |
| 2,413,675 | Baker | Jan. 7, 1947 |
| 2,448,822 | Pinardi et al. | Sept. 7, 1948 |
| 2,464,059 | Roos et al. | Mar. 8, 1949 |
| 2,511,039 | Black et al. | June 13, 1950 |